United States Patent [19]

Kalnins

[11] 4,375,784
[45] Mar. 8, 1983

[54] DIAPHRAGM TYPE BREATHER SYSTEM FOR SEALED STORAGE STRUCTURE

[75] Inventor: Lauris Kalnins, Bloomingdale, Ill.

[73] Assignee: A. O. Smith Harvestore Products, Inc., Arlington Heights, Ill.

[21] Appl. No.: 312,735

[22] Filed: Oct. 19, 1981

[51] Int. Cl.³ .................. A01F 25/00; A01F 25/14; A01F 25/22

[52] U.S. Cl. .................. 99/646 S; 98/55; 99/646 R; 220/85 B; 220/85 VS

[58] Field of Search .............. 99/646 S, 646 R, 646 C, 99/485, 467, 472, 473; 98/54, 55; 220/85 R, 85 B, 85 VS, 86 R; 150/1; 52/29, 39, 192

[56] References Cited

U.S. PATENT DOCUMENTS

| | | | |
|---|---|---|---|
| 2,551,217 | 5/1951 | Martin | 99/646 S |
| 3,076,403 | 2/1963 | Behlen | 99/646 S |
| 4,135,443 | 1/1979 | Warren | 99/646 S |
| 4,321,866 | 3/1982 | Thompson | 99/646 S |

Primary Examiner—Robert W. Jenkins
Assistant Examiner—Timothy F. Simone

Attorney, Agent, or Firm—Andrus, Sceales, Starke & Sawall

[57] ABSTRACT

An improved breather system for a sealed storage structure. An annular flexible diaphragm is located within the upper portion of the storage structure and the inner periphery of the diaphragm is sealed to a central inlet feed tube, while the outer periphery is sealed to an impervious platform that is mounted on the wall of the structure beneath the roof. A manhole is provided in the roof for entry onto the platform by workmen in order to repair or replace the diaphragm. The diaphragm and platform separate the storage structure into a lower storage chamber and an upper chamber which is exposed to the atmosphere. The diaphragm will move up and down within the structure in accordance with the pressure differential between the chambers. The diaphragm has a substantially greater surface area than the cross section area of the storage structure, so there is substantial travel between its uppermost and lowermost positions to thereby greatly increase the breathing capacity over conventional breather systems.

21 Claims, 8 Drawing Figures

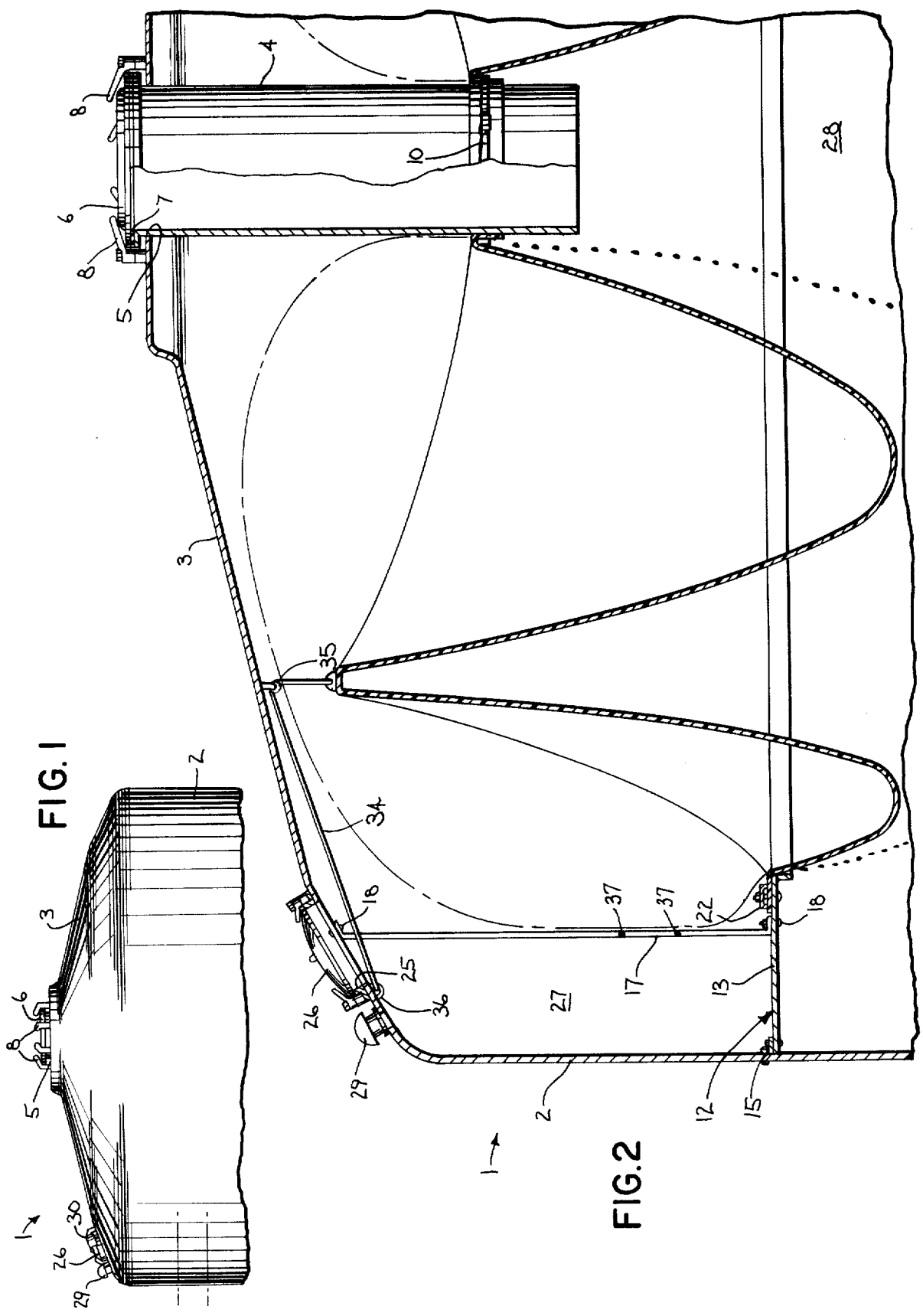

DIAPHRAGM TYPE BREATHER SYSTEM FOR SEALED STORAGE STRUCTURE

BACKGROUND OF THE INVENTION

Silage and other perishable materials are frequently stored in air-tight storage structures or silos. As there can be a substantial differential in pressure between the atmosphere and the sealed interior of the structure, a breathing system is normally used with the sealed structures. One commonly used type of breathing system is a closed breather bag, which is suspended in the upper end of the structure and is connected via a tube in the roof of the structure to the atmosphere. The bag will expand and contract in accordance with pressure variations between the interior and exterior of the structure. The breather bag has the advantage that it can be readily removed through an opening in the roof for repair or replacement, but the breathing capacity of this type of system is, of course, limited to the volume of the breather bag.

Breather systens utilizing a diaphragm have also been suggested in the past, such as those shown in the patents to Martin U.S. Pat. No. 2,551,217 and Bahlen U.S. Pat. No. 3,076,403. While a diaphragm type breather system can increase the breathing capacity over a breather bag, repair or replacement of the diaphragm has been a problem that has not been successfully solved. To repair or replace the diaphragm in the prior art systems, it has been necessary for a workman to enter the sealed structure using a respiratory system and to erect a scaffold on the stored material up to the level of the diaphragm. Due to the difficulties in maintenance of the diaphragm, diaphragm-type breather systems have not been successfully utilized in the field.

SUMMARY OF THE INVENTION

The invention is directed to an improved breather system for a sealed storage structure utilizing a flexible diaphragm. In accordance with the invention, an annular flexible diaphragm is located within the upper portion of the storage structure and the inner periphery of the diaphragm is sealed to a central inlet feed tube which extends downwardly from the roof of the structure, while the outer periphery of the diaphragm is sealed to an impervious platform or scaffold that is mounted on the wall of the structure beneath the roof. The diaphragm separates the structure into a lower storage chamber an an upper chamber which is exposed to atmospheric pressure, and the diaphragm will move in accordance with the pressure differential between the chambers.

As the surface area of the diaphragm is substantially greater than the cross-sectional area of the storage structure, the diaphragm is capable of moving between extreme limits. Under equalized or zero pressure conditions, the diaphragm is held in a semi-raised position, where it will not interfere with material being loaded into the storage structure, by a series of elastic cords. With the structure sealed and under negative pressure conditions in the storage chamber, the diaphragm can hang downwardly and drape over the upper surface of the stored material, while under positive pressure conditions, the diaphragm will be expanded toward the roof. Thus, the diaphragm provides a substantial increase in breathing capacity over conventional breather systems.

A breather valve is secured in the roof for passage of air to and out of the upper chamber above the diaphragm under changing atmospheric conditions. In addition, a safety valve can be secured in the roof and connected to the lower storage chamber, so that gases can be discharged from the lower storage chamber in the event excessive pressure develops in the storage chamber.

As a feature of the invention, a manhole is provided in the roof for entry into the structure by a workman, who can then stand on the platform or scaffold to remove or repair the diaphragm. This greatly facilitates the maintenance of the diaphragm. Moreover, as the workman, standing on the platform, is in a zone exposed to the atmosphere, no respiratory system is required as would be necessary if the workman was forced to enter the chamber containing the stored material.

DESCRIPTION OF THE DRAWINGS

The drawings illustrate the best mode presently contemplated of carrying out the invention.

In the drawings:

FIG. 1 is a partial side elevational view of the structure to which the diaphragm is applied;

FIG. 2 is a horizontal section taken generally on line 2—2 of FIG. 3;

DESCRIPTION OF THE ILLUSTRATED EMBODIMENT

Figure 3:
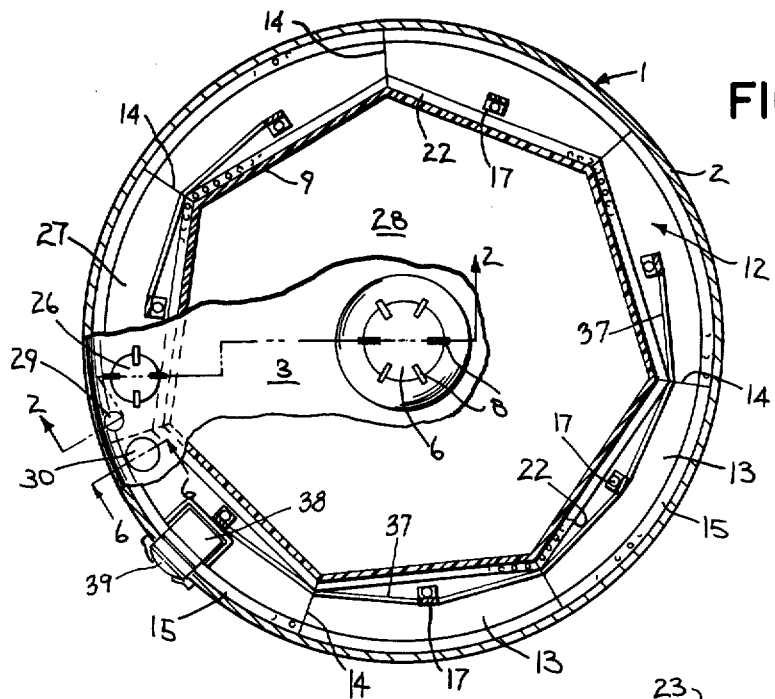
FIG. 3 is a top view illustrating the platform with parts broken away.

Referring to the drawings there is shown a portion of a substantially air tight storage structure 1 such as a silo which is adapted to contain silage, hay, grains and other perishable materials which require protection from spoilage by the ambient atmosphere. Structure 1 is normally supported on a concrete foundation, not shown, and includes a generally cylindrical shell 2 extending upwardly from the foundation and a roof 3. Silage or other stored material is removed from storage structure 1 by a bottom unloader, not shown, similar in structure and function to that described and shown in Tiedemann U.S. Pat. No. 2,635,770 and which forms no part of the present invention.

A filler tube or pipe 4 for loading the material to be stored in structure 1 is secured in a sealed manner around a generally central opening 5 in roof 3. Feed tube 4 extends downwardly a substantial distance from roof 3 into structure 1. When material is not being loaded through tube 4, the tube is closed by the filler door 6 which is secured to roof 3 over opening 5 and a gasket 7 by a plurality of intermittent clamps 8 so that opening 5 is securely sealed against the entry of air.

In accordance with the invention, a breather system is incorporated with the storage structure, and the breather system includes a flexible annular, impervious breather diaphragm 9 located in the upper end portion of the storage structure 1.

Figure 5:
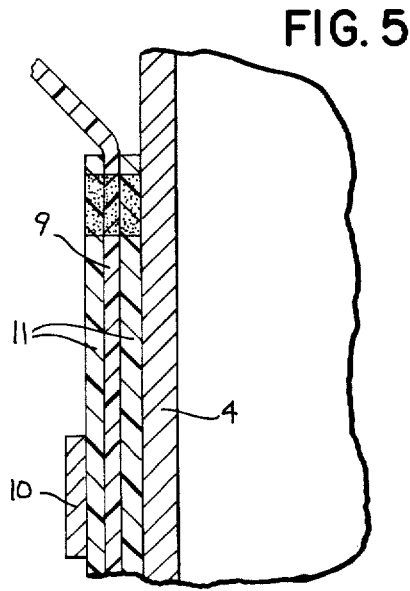
FIG. 5 is an enlarged fragmentary view illustrating the diaphragm connection to the filler tube as shown in FIG. 2.
Figure 6:
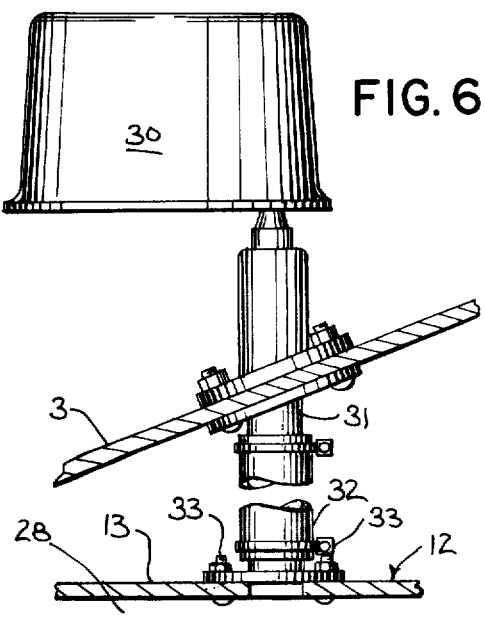
FIG. 6 is an enlarged fragmentary view taken generally on line 6—6 of FIG. 3 and illustrating a safety valve shown in FIG. 3.
Figure 7:
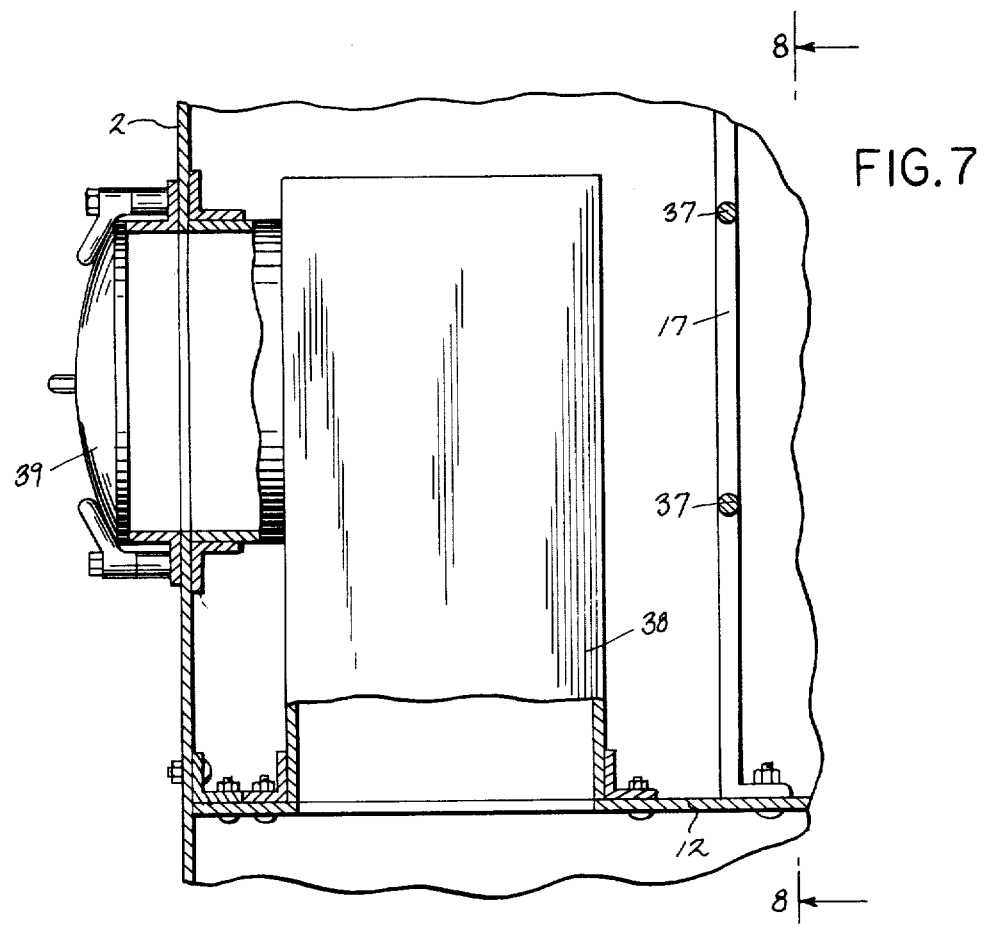
FIG. 7 is a section taken along line 7—7 of FIG. 3.

The inner peripheral edge of diaphragm 9 is secured and sealed to the lower end portion of the feed tube 4 by a clamp 10, which overlies the diaphragm 9 and a multiplicity of layers of diaphragm material 11 disposed between clamp 10 and diaphragm 9, as most clearly shown in FIG. 5.

The outer peripheral edge of diaphragm 9 is secured to a workman supporting access platform 12 which extends circumferentially around the inside of the shell of the structure and is secured in sealed relation to the shell 2.

Platform 12 is preferably constructed of a plurality of segments 13 which are suitably secured together at the sealed joints 14. The outer periphery of platform 12 is secured to shell 2 by angle irons 15 which are connected in sealing engagement to shell 2 and platform 12 by the respective bolts 16. In addition, platform 12 is supported from roof 3 by circumferentially spaced steel straps 17, the ends of which are attached by the respective bolts 18 in a sealed manner to roof 3 and to the platform 12. Ordinarily, there would be at least one strap 17 for each segment 13 of platform 12.

Figure 4:
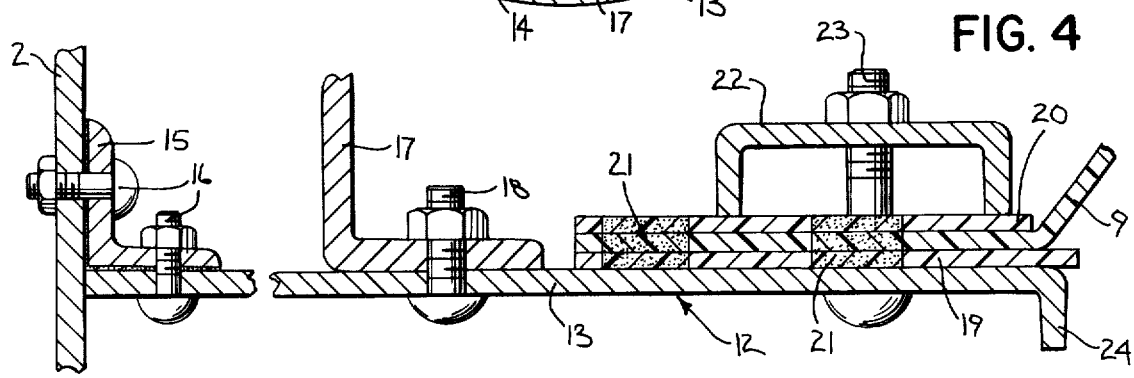
FIG. 4 is an enlarged fragmentary view illustrating the platform mounting the diaphragm connection shown in FIGS. 2 and 3.

As shown in FIG. 4, the outer peripheral edge of diaphragm 9 overlaps platform 12 and can be sandwiched between layers of plastic film 19 and 20. The diaphragm 9 and plastic films 19 and 20 are heat sealed together as at 21. An inverted channel-shaped clamp bar 22 overlies the assembled edge portion of diaphragm 9 and the respective plastic films 19 and 20 and is secured to platform 12 by a bolt 23 which extends through the center of clamp bar 22. When bolt 23 is tightened into place, the legs of clamp bar 22 securely clamp and seal the outer edge portion of diaphragm 9 and plastic films 19 and 20 to platform 12. Alternately, the edge portion of the diaphragm 9 can be sealed directly to the platform 12 through clamp bar 22 without use of the layers of plastic film 19 and 20.

A satisfactory width for platform 12 to permit a workman to stand behind diaphragm 9 on platform 12 has been found to be about eighteen inches and the inner periphery of platform 12 is turned downwardly as at 24, so that diaphragm 9 is prevented from being damaged during operational flexing.

A manhole 24 is located in roof 3 of the structure 1 above platform 12 so that a workman can gain access to the inside of the structure and to platform 12. The manhole 25 is normally closed by a cover 26 which can be sealed to the roof 3.

The diaphragm 9 divides the inside of structure 1 into the upper chamber 27 and a lower storage chamber 28. Upper chamber 27 is open to the ambient air through the vent 29 which is secured to roof 3 so that the air under changing atmospheric conditions can flow either in or out of chamber 27 through vent 29. Thus, the diaphragm 9 will move up or down to balance the pressure differential between the atmosphere and the lower storage chamber 28.

Storage chamber 28 is sealed by diaphragm 9 against entry of air and contains only gases which are developed by the material stored in the storage chamber. To prevent an excessive buildup of pressure in the storage chamber 28, a control valve 30 is secured to roof 3 and is connected to storage chamber 28 by a flexible tube 31 which extends through chamber 27 and platform 12 and opens into storage chamber 28. Valve 30 is set to open at a predetermined pressure and to relieve any excess pressure build up in storage chamber 28. The ends of tube 31 are connected in sealed relation to fittings 32, which are mounted on the underside of roof 3 and platform 12, respectively, by clamps 33. As tube 31 is preferably made of flexible material, alignment of fittings 32 is not critical.

As best illustrated in FIG. 1, the diaphragm 9 has a substantially greater surface area than the cross sectional area of the storage structure, so that the diaphragm is capable of considerable movement between its uppermost and lowermost positions.

Under equalized pressure conditions, as for example, when material is being loaded into the storage structure through filler tube 4, the diaphragm 9 is held in a semi-raised position, as illustrated by the full lines in FIG. 2, by a plurality of elastic or extendible cords 34. In this semi-raised or expanded position it will not interfere with the material being fed into the structure. One end of each cord 34 is attached to an eye or loop on the diaphragm, and each cord extends over a pulley 35 and is dead-ended at an eye 36 on roof 3.

During operation, with the storage chamber 28 sealed to the atmosphere, a negative pressure differential in the storage chamber will cause the diaphragm to move downwardly, as shown by the dotted lines in FIG. 2, stretching the cords 34, and depending on the level of the stored material in the structure, the diaphragm can drape over the upper surface of the stored material. Under positive pressure conditions in the storage chamber 28, the diaphragm will be expanded upwardly toward the roof 17, as shown by the dashed lines in FIG. 2.

Straps 17 serve a multiple function. They serve to support the platform 12 as well as providing a handhold for a workman on the platform. In addition, the straps function as a stop to prevent the diaphragm 9 from expanding under positive pressure conditions, into the area above the platform, thus insuring that the platform will be accessible to the workman.

Figure 8:
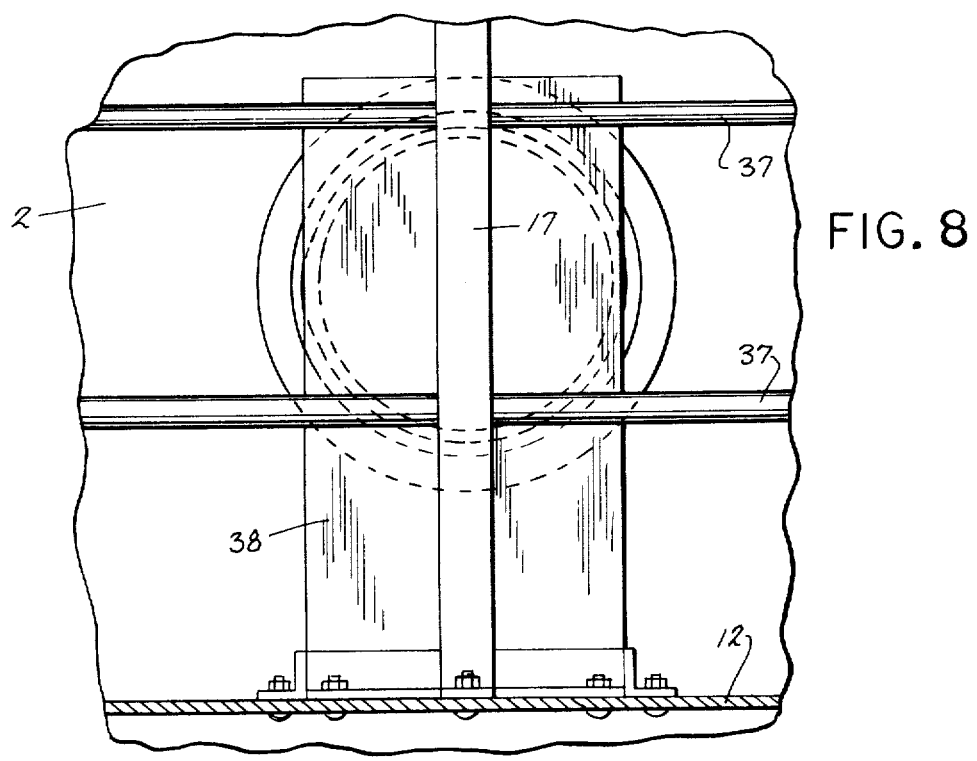
FIG. 8 is a section taken along line 8—8 of FIG. 7.

To provide further safety for a workman on platform 12, hand rails 37 can be connected between adjacent straps 17, as best shown in FIG. 8. In addition, a ladder, nor shown, can be positioned between the manhole 26 and platform 12 to enable the workman to move from the manhole to the platform.

During filling of the storage structure, substantial quantities of air will be blown into the storage chamber 28 along with the stored material. To vent the air from the storage chamber the lower end of a duct 38 is mounted in sealed relation within an opening in platform 12, while the upper end of the duct communicates with an opening in the wall 2 of the storage structure. The opening in the side wall 2 is normally sealed off by a door or closure 39. When filling the storage structure, door 39 is opened so that air being blown into the storage chamber 29 through filler tube 4 can be vented through duct 38 to the atmosphere. By positioning the door 39 above the level of the platform 12, the storage capacity of the structure is not reduced.

The invention provides increased breathing capacity for a sealed storage structure by enabling the entire upper end of the structure to be used for breathing.

The clamp 10 provides a convenient means for varying the breathing capacity of the system. By loosening the clamp 10, and moving the connection up or down on filler tube 4, the breathing capacity can be changed. For example, depending on the diameter of the storage structure, the breathing capacity can be varied from 20% to 30% by moving the clamp 10 between its uppermost and lowermost positions on tube 4.

The invention also overcomes the problems encountered with prior types of diaphragm breather systems by incorporating an access platform at the upper end of the structure to enable a workman to conveniently repair or replace the diaphragm without entering the storage chamber.

While the drawings have illustrated the platform 12 as extending around the structure, it is contemplated that one or more platforms of various configurations can be employed and can be located at various positions within the structure. Similarly, the inlet feed tube 4, while shown to be located centrally of the roof, can be located at any desired position.

Various modes of carrying out the invention are contemplated as being within the scope of the following claims particularly pointing out and distinctly claiming the subject matter which is regarded as the invention.

I claim:

1. A sealed storage structure having an improved breather system, comprising a vessel to contain a stored material and including a wall and a roof enclosing the upper end of the wall, an impervious sealed structure extending transversely across the vessel and dividing the vessel into an upper chamber and a lower storage chamber, inlet means for introducing a stored material into the storage chamber, said sealed structure comprising a rigid impervious generally horizontal platform secured in sealed relation to said wall and a flexible diaphragm sealed to said platform, and outlet means in the vessel providing communication between said upper chamber and the atmosphere, pressure differentials between the storage chamber and the atmosphere causing said diaphragm to flex to thereby balance said pressure differential.

2. The breathing structure of claim 1, wherein said diaphragm has a surface area greater than the cross sectional area of the vessel.

3. The structure of claim 1, wherein said inlet means is disposed in the roof and the diaphragm is sealed to said inlet means.

4. The structure of claim 3, wherein said inlet means comprises an inlet tube disposed centrally of the roof and extending downwardly within said vessel.

5. The structure of claim 1, wherein said platform extends around the entire inner surface of the vessel, the outer edge of said diaphragm being sealed to said platform.

6. The structure of claim 5, and including a plurality of connecting members connecting the inner edge portion of said platform to said roof, said connecting members being spaced circumferentially around said vessel.

7. The structure of claim 1, and including a manhole in the roof and located above the platform whereby a workman can enter the upper chamber through said manhole and stand on said platform.

8. The structure of claim 1, and including means connected to said diaphragm for changing the position of said diaphragm to vary the relative volume of said upper and lower chambers to thereby vary the breathing capacity of said system.

9. A sealed storage vessel having an improved breathing system, comprising a vessel to contain a stored material and including a wall and a roof to enclose the upper end of the wall, an annular impervious platform secured in sealed relation to said wall a distance below said roof, a flexible impervious diaphragm disposed within the vessel and having an outer peripheral edge sealed to the inner edge of said platform, said platform and diaphragm constituting an impervious sealed structure dividing the vessel into an upper chamber and a lower storage chamber, inlet means for introducing a stored material into said storage chamber, and outlet means in the vessel providing communication between the upper chamber and the atmosphere, the pressure differential between the storage chamber and the atmosphere causing said diaphragm to flex to balance said pressure differential.

10. The structure of claim 9, wherein said inlet means comprises an inlet tube disposed in said roof, said diaphragm having an inner annular edge connected in sealed relation to said inlet tube.

11. The structure of claim 10, and including adjustable means for connecting said inner annular edge to said inlet tube, said adjustable means being movable axially of said tube to thereby vary the breathing capacity of said system.

12. The structure of claim 9, and including a plurality of connecting members interconnecting the inner peripheral edge of the platform and said roof, said connecting members serving to support the platform and provide a hand grip for an operator standing on the platform.

13. The structure of claim 9, and including valve means interconnecting the storage chamber and the atmosphere and responsive to a predetermined maximum pressure in said storage chamber for relieving pressure within the storage chamber.

14. The structure of claim 13, wherein said valve means comprises a valve member disposed within an opening in the roof, and a conduit connected to the valve member and extending downwardly through an opening in said platform to provide communication between the storage chamber and said valve member.

15. The structure of claim 13, and including air vent means providing communication between said storage chamber and the atmosphere for venting air from the storage chamber when stored material is being introduced into the storage chamber through said inlet means, and a removable sealed closure to enclose said vent means.

16. The structure of claim 15, wherein said air vent means includes a duct mounted in sealed relation within an opening in said platform and extending upwardly from said platform, said closure being connected to said duct.

17. A sealed storage structure having an improved breather system, comprising a foundation, a vessel mounted on the foundation and adapted to contain a stored material, said vessel including a wall and a roof enclosing the upper end of the wall, an inlet feed tube disposed in the roof for introducing a stored material into the vessel, an annular impervious platform secured to the upper portion of said wall and spaced beneath said roof, first sealing means for sealing the outer peripheral edge of the platform to said wall, said platform extending generally horizontally and being of sufficient radial dimension to permit a workman to stand thereon, an annular flexible diaphragm disposed within the vessel, second sealing means for sealing the outer peripheral edge of the diaphragm to the inner peripheral edge of said platform, third sealing means for sealing the inner peripheral edge of the diaphragm to said inlet feed tube, said platform and diaphragm dividing said vessel into an upper chamber and a lower storage chamber to contain the stored material, and outlet means in the upper portion of the vessel and providing communication between said upper chamber and the atmosphere, the pressure differential between the atmosphere and said storage chamber causing said diaphragm to flex within the vessel to thereby balance said pressure differential.

18. The structure of claim 17, and including a manhole located in the roof above said platform, whereby a workman can enter said upper chamber and stand on the platform in order to repair or maintain said diaphragm.

19. The structure of claim 17, and including a plurality of circumferentially spaced supports interconnecting the platform and the roof to thereby support the platform.

20. A sealed storage structure having an improved breather system, comprising a vessel to contain a stored material and including a wall and a roof enclosing the upper end of the wall, an impervious sealed structure extending transversely across the vessel and dividing the vessel into an upper chamber and a lower storage chamber, inlet means for introducing a stored material into the storage chamber, said sealed structure comprising a rigid impervious generally horizontal platform secured in sealed relation to said wall and a flexible diaphragm sealed to said platform, outlet means in the vessel providing communication between said upper chamber and the atmosphere, a greater pressure in said upper chamber than in said lower chamber moving said diaphragm to a lower position and a lesser pressure in said upper chamber than in said lower chamber moving said diaphragm to an upper position, and extendible support means interconnecting said vessel and said diaphragm for supporting said diaphragm in an intermediate position under balanced pressure conditions.

21. The structure of claim 20, wherein said platform extends around the entire inner surface of the vessel, the outer edge of said diaphragm being sealed to said platform, said inlet means comprises an inlet tube disposed in the roof, said diaphragm having an opening disposed in sealed relation to said inlet tube, said extendible support means comprises a plurality of resilient members connecting said roof and said diaphragm.

* * * * *